United States Patent [19]

Hamisch, Jr.

[11] Patent Number: 4,690,723

[45] Date of Patent: Sep. 1, 1987

[54] HAND-HELD LABELER

[75] Inventor: Paul H. Hamisch, Jr., Franklin, Ohio

[73] Assignee: Monarch Marking Systems, Inc., Dayton, Ohio

[21] Appl. No.: 871,659

[22] Filed: Jun. 6, 1986

Related U.S. Application Data

[62] Division of Ser. No. 408,310, Aug. 16, 1982, Pat. No. 4,619,727.

[51] Int. Cl.[4] ........................ B44B 5/00; B32B 31/00

[52] U.S. Cl. .................................... 156/541; 156/577; 156/579; 156/DIG. 39; 156/DIG. 48

[58] Field of Search ............... 156/384, 387, 391, 475, 156/488, 523, 526, 539, 540, 541, 574, 577, 579, 584, DIG. 39, DIG. 48; 206/389, 403, 404, 405, 406, 411, 813; 400/134.4, 134.5

[56] References Cited

U.S. PATENT DOCUMENTS

| | | | |
|---|---|---|---|
| 2,334,458 | 11/1943 | Van Tuyl | 156/DIG. 48 |
| 2,368,262 | 1/1945 | Oftedahl et al. | 156/DIG. 48 |
| 2,400,435 | 5/1946 | Nelson et al. | 156/DIG. 48 |
| 2,569,140 | 9/1951 | Avery | 156/540 |
| 2,586,835 | 2/1952 | Leger | 156/526 |
| 3,600,255 | 8/1971 | Hinds | 156/577 |
| 3,666,601 | 5/1972 | Wuerch | 156/577 |
| 4,060,444 | 11/1977 | Schweig et al. | 206/411 |

FOREIGN PATENT DOCUMENTS

| | | | |
|---|---|---|---|
| 761531 | 3/1934 | France | 206/407 |
| 202047 | 5/1965 | Sweden | 400/134.5 |
| 561134 | 4/1975 | Switzerland | 156/541 |

*Primary Examiner*—Donald E. Czaja
*Assistant Examiner*—L. Falasco
*Attorney, Agent, or Firm*—Joseph J. Grass

[57] ABSTRACT

There is disclosed a hand-held labeler which uses labels releasably adhered to a carrier web. The labeler has a body with a pair of identical body sections. The body mounts first, second and third feed rolls. The first and third feed rolls project beyond the body and cooperate respectively with the second feed roll. The body has a delaminator and a guideway for the carrier web. The carrier web can be threaded through the guideway and about the delaminator in either direction. In either event, the first, second and third feed rolls cooperate with the carrier web to advance it and effect label delamination. Depending on the direction of threading, either the first or the third feed roll is used to advance the carrier web by rolling that feed roll along the surface to be labeled. A label roll is held captive in a holder having two identical body sections. In an alternative embodiment, a label strip winding feature enables a strip of labels to be wound into a roll for subsequent use in the labeler. Common identical molded parts enable low-cost construction. There are also disclosed method of making a labeler and method of labeling.

23 Claims, 10 Drawing Figures

FIG-2
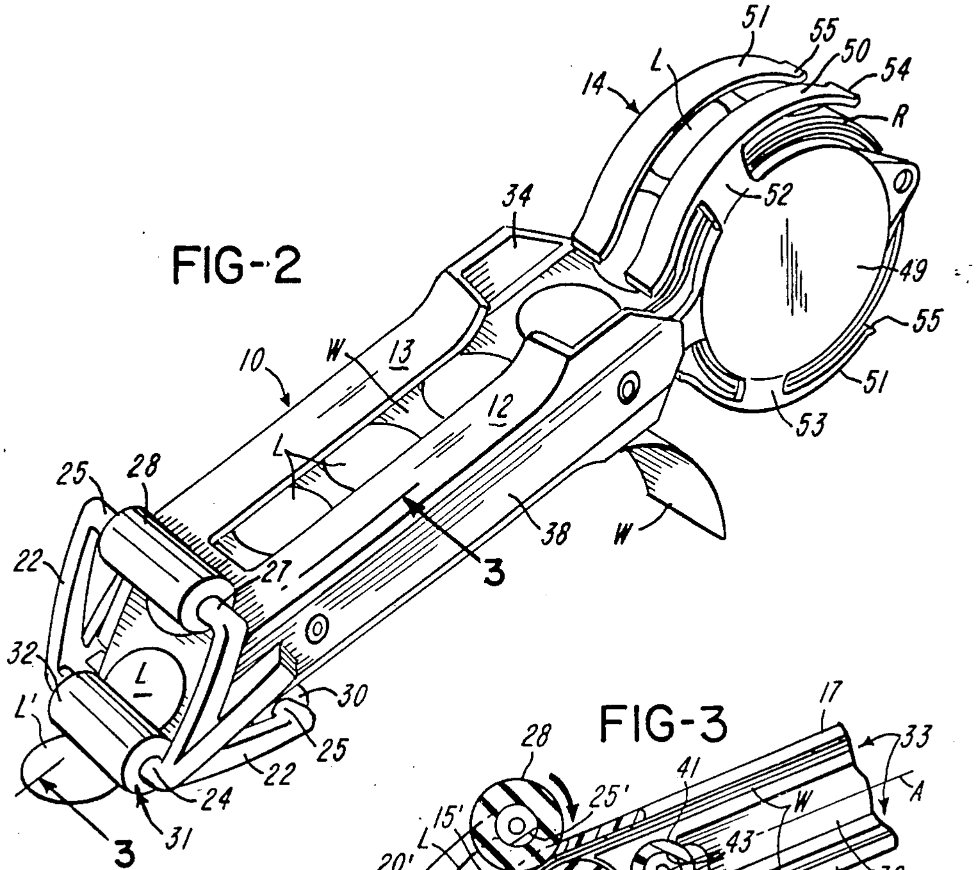
FIG-3
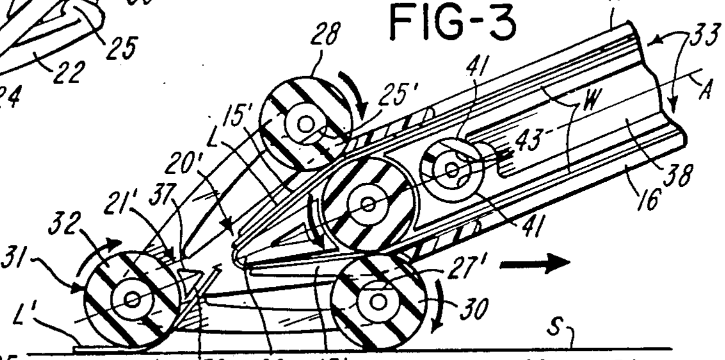
FIG-4
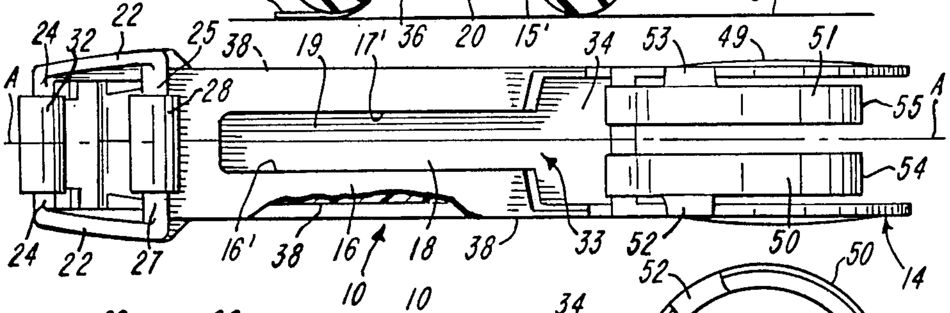
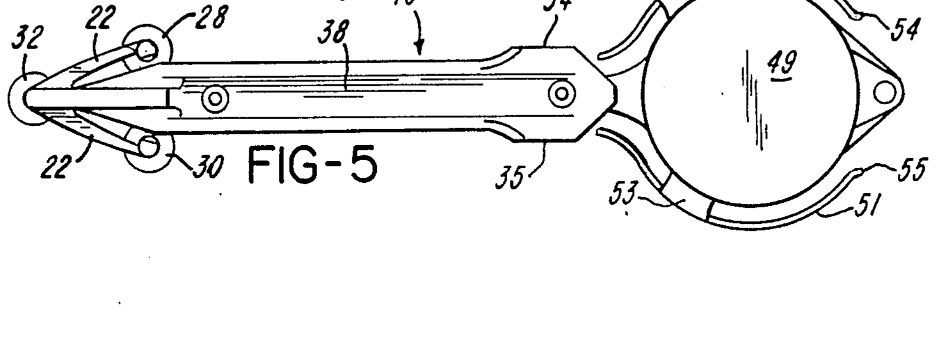
FIG-5

HAND-HELD LABELER

CROSS-REFERENCE TO RELATED APPLICATION

This application is a division of Ser. No. 408,310, filed Aug. 16, 1982, now U.S. Pat. No. 4,619,727, issued Oct. 28, 1986.

BACKGROUND OF THE INVENTION

1. Field of the Invention

This invention relates to the labeling art.

2. Brief Description of the Prior Art

U.S. Pat. No. 2,569,140 to Avery granted Sept. 25, 1951 discloses a labeler in which labels releasably adhered to a carrier web are dispensed by a delaminator into underlying relationship with respect to an applicator roll. The carrier web is advanced by a pair of feed rolls mounted by the labeler casing. One of the feed rolls projects beyond the casing and can be rolled on the surface to be labeled.

U.S. Pat. No. 3,330,207 to De Man granted July 11, 1967 discloses a hand-held labeler for applying labels releasably adhered to a carrier web. This labeler includes a housing enclosing a toothed feed wheel for engaging the carrier both upstream and downstram of a label delaminator.

U.S. Pat. No. 4,116,747 to Hamisch, Jr. granted Sept. 26, 1978 discloses a hand-held labeler with a feed wheel and a die roller urged against the feed wheel by a pair of leaf springs.

SUMMARY OF THE INVENTION

This invention realtes to a simple, low-cost hand-held labeler for applying labels relates adhered to a carrier web. The labeler has a body with a delaminator for successively delaminating labels from the carrier web and an applicator for applying labels. The labeler has a guideway through which the carrier web can be threaded. In the preferred construction the carrier web can be threaded along the guideway in either direction. A set of first, second and third feed rolls are positioned to drivingly contact the carrier web both upstream and downstream of the delaminator. The first and second feed rolls cooperate with the carrier web upstream of the delaminator and the second and third feed rolls cooperate with the carrier downstream of the delaminator. The first and third feed rolls project beyond the body. Depending upon the direction in which the carrier web is threaded, either the first feed roll or the third feed roll can be rolled on the surface to be labeled. Rotation of one of these rolls against that surface advances the carrier web and effects delamination of labels one-at-a-time into label applying relationship between the applicator and that surface. The applicator preferably includes a roll. The first, second and third feed rolls and the applicator roll are preferably of the same diameter, both body sections are preferably identical, and the body can mount a label roll holder having identical body sections; this promotes commonality and reduces the number of unique parts. The mounting structure for the first and third feed rolls includes two pairs of leaf springs which urge the first and third feed rolls resiliently into feeding cooperation with the second feed roll.

The invention also relates to method of making and to method of using a labeler following unique steps disclosed in the present application.

BRIEF DESCRIPTION OF THE DRAWINGS

FIG. 2 is a perspective view of the labeler shown in FIG. 1, but shown assembled;

FIG. 3 is a sectional view taken along line 3—3 of FIG. 2;

FIG. 4 is a top plan view of the labeler shown in FIG. 4;

FIG. 5 is a left side elevational view of the labeler;

DETAILED DESCRIPTION OF THE PREFERRED EMBODIMENTS

Figure 1:
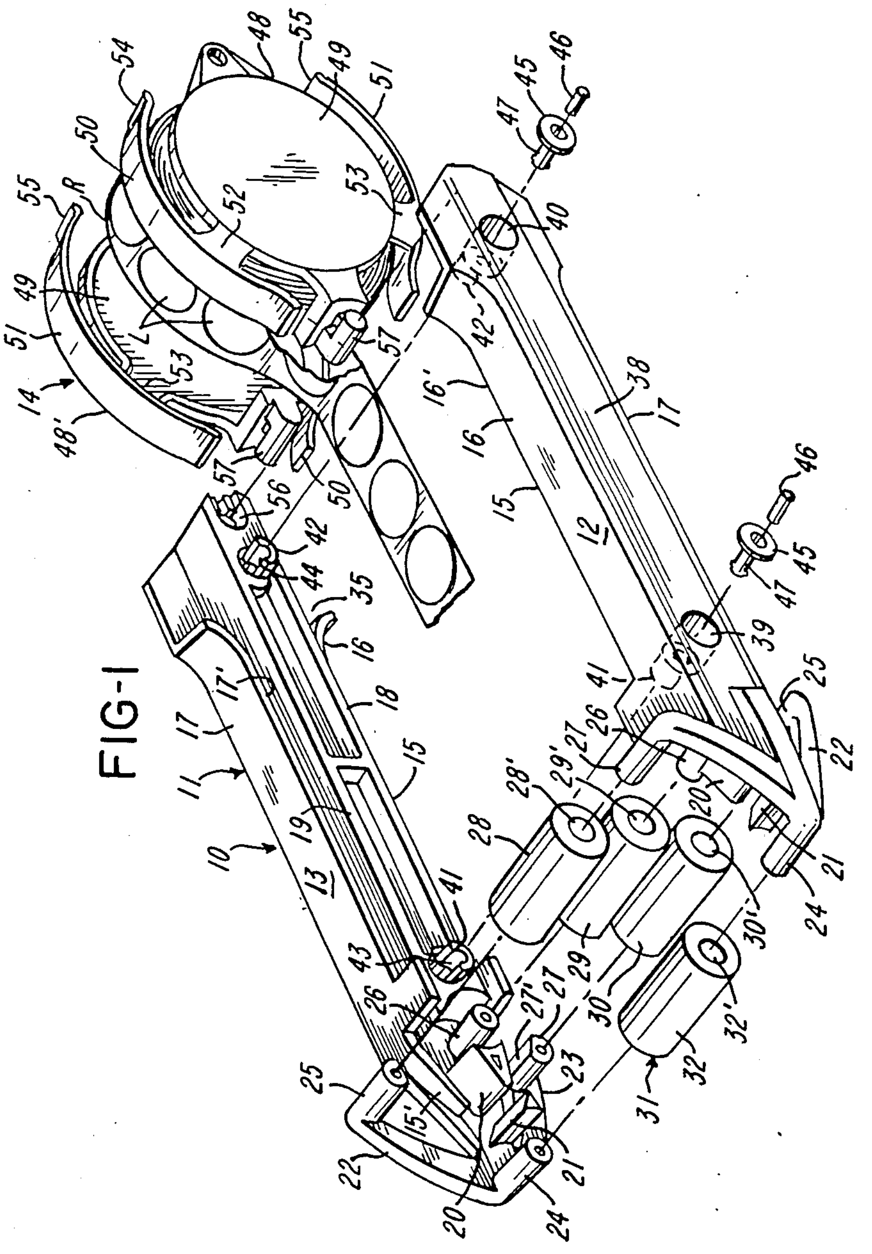
FIG. 1 is an exploded perspective view of a hand-held labeler according to the invention.
Figure 6:
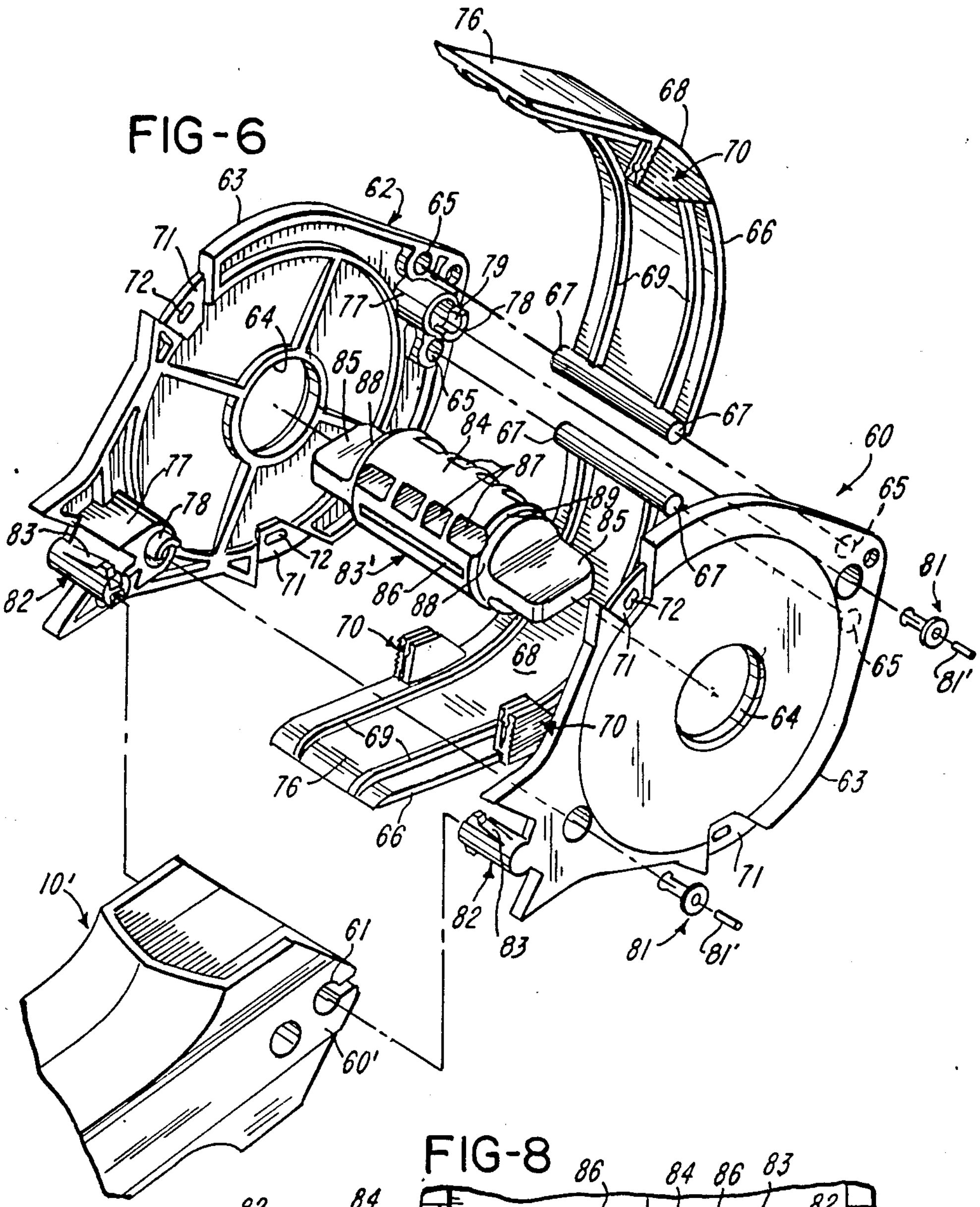
FIG. 6 is a partly exploded perspective view of a fragmentary portion of a labeler body and a label roll holder with a winder in accordance with an alternative embodiment of the invention.

With reference initially to FIG. 1, there is shown a labeler generally indicated at 10 which includes a body or frame 11 having a pair of body or frame sections 12 and 13. Although the labeler 10 can be used to apply labels from a supply roll R carried in a label roll holder 14, in the event it is desired to apply labels in strip form, the holder 14 can be omitted during manufacture of the labeler 10.

The body sections 12 and 13 are shown to be identical according to a preferred embodiment, so that various portions of the body sections 12 and 13 are referenced using the same reference characters. Each body section 12 and 13 is shown to include an elongate portion 15 with spaced outer walls 16 and 17 and intervening guides or guide members 18 and 19. Each body section 12 and 13 has a delaminator portion 20, a deflector portion 21, a pair of leaf springs or spring portions 22 and 23, an applicator roll mounting portion or stud 24, and feed roll mounting shaft portions or studs 25, 26 and 27. The pair of aligned studs 25 and 27 together comprise a shaft that rotatably mounts a feed roll 28, the pair of aligned studs 26 and 26 together comprise a shaft that rotatably mounts a feed roll 29, the pair of aligned studs 27 and 25 together comprise a shaft that rotatably mounts a feed roll 30, and the pair of aligned studs 24 together comprise a shaft that rotatably mounts an applicator generally indicated at 31 shown to take the form of a roll 32. The studs 24, 25, 26 and 27 preferably have the same length and outside diameter. The rolls 28, 29, 30 and 32 have through-holes 28', 29', 30' and 32' and are preferably identical in size and shape and are composed of the same elastomeric material. The leaf springs 22 and 23 of each pair are molded in such a position or orientation that when the labeler 10 is assembled the feed rolls 28 and 29 are in pressure contact because the related pair of leaf springs 22 and 23 are sprung slightly away from their as-molded positions. As shown, the studs 25 and 27 have respective relieved or cutaway portions 25' and 27' adjacent the nip of pairs of rollers 28 and 29, and 29 and 30 to enable the rolls 28 and 30 to better yield under the urging of leaf springs 22 and 23. The studs 25 and 27 of each pair, the pair of studs 26, and the pair of studs 24 are preferably in end-to-end abutting relationship and the delaminator portions 20 are preferably in end-to-end abutting relationship. Together the delaminator portions 20 provide a delaminator 20'.

The wall 18 of body section 12 is in end-to-end abutting relationship with wall 19 of body section 13, and correspondingly the wall 19 of body section 12 is in end-to-end abutting relationship with wall 18 of body section 13. The walls 16 and 17 are shown to be relieved or cut away through almost their entire lengths as indicated at 16' and 17' to provide a gap to facilitate threading the labeler. One abutting pair of walls 18 and 19 and the adjacent pair of walls 16 and 17, and the other abutting pair of walls 18 and 19 and the adjacent pair of walls 16 and 17 define grooves which provide a guideway generally indicated at 33 (FIG. 3). A carrier web W has a series of labels L releasably adhered to it by pressure sensitive adhesive. Label separation occurs at the delaminator 20' provided by a label-separating edge where the carrier web W is caused to undergo a sharp change of direction as best shown in FIG. 3. The carrier web W can enter the guideway 33 of the labeler body 11 either from the holder 14 or through an opening or port 34 and the carrier web W (from which labels L have been delaminated at the delaminator 20') can exit the passageway 33 through the other opening or port 35. As is apparent, the upper and lower portions of the labeler 10 are identical in all respects so that the carrier web W can be threaded through the passageway 33 in the direction illustrated in FIGS. 1, 2 and 3 or in the opposite direction. In the event the labeler 10 is threaded in the direction illustrated, the carrier web passes into the passageway 33 either from the holder 14 or through port 34 and is guided between the nip of feed rolls 28 and 29. From there the carrier web W passes about the delaminator 20' where label separation occurs as the carrier web W is advanced. The leading label L' is deflected by deflector 21', composed of deflector portions 21, into underlying label applying relationship with respect to the applicator roll 32. In the orientation shown in FIG. 3 deflection is effected by a deflector 15' on each body section 12 and 13 and thereafter by surface 36 of the deflector 21'. After passing about the delaminator 20' the carrier web W passes into the nip of feed rolls 29 and 30 and from there the carrier web W passes along the remainder of the guideway 33 and exits at the port 35. The carrier web W is advanced by rolling the feed roll 30 along surface S to which the leading label L' is shown in FIG. 3 to be in the process of being applied. The feed roll 30 cooperates with the feed roll 29 at a location downstream of the delaminator 20'. The advancing motion of the carrier web W causes rotation of the feed roll 29. The feed roll 29 is in contact with the carrier web W upstream of the delaminator 20' as well as downstream of the delaminator 20'. Motion of the portion of the carrier web W upstream of the delaminator 20' causes the feed roll 28 to rotate. The two pairs of spring arms 22, 23 and 22, 23 cause feed rolls 28 and 30 to be urged against feed roll 29 which is in common cooperation with feed rolls 28 and 30. The construction and arrangement of the feed rolls 28, 29 and 30 is simple and yet effective and does not require any gearing between feed rolls 28, 29 and 30. The center of rotation of the rolls 28, 29 and 32 are at the vertices of a first isosceles triangle. and the centers of rotation of the rolls 29, 30 and 32 are at the vertices of a second isosceles triangle having the same size and shape as the first triangle. If desired, the labeler can be threaded in a direction opposite to the direction shown, namely, the labeler 10 could be turned upside down from the position shown and the carrier web W could be passed either from the holder 14 or through port 35 into the passageway 33. In such an orientation the label supply roll R would, of course, also be turned around. The carrier web W first passes between feed rolls 29 and 30, from there to and about the delaminator 20', from there between feed rolls 28 and 29, and from there along the remainder of the passageway 33 from where it exits at port 34. The leading label L' is deflected by two deflectors 15' and thereafter by surface 37 of the deflector 21' into label applying relationship with respect to the applicator roll 32. with this threading pattern, the feed roll 28 contacts the surface S.

The labeler 10 has an axis which passes through the feed roll 29 and the applicator roll 32. The feed roll 28 is on one side of the axis A and the feed roll 30 is on the other side of the axis. The labeler 10 is symmetrical about the vertical plane and also about a horizontal plane through the axis A.

The labeler 10 is easy to hold between the user's fingers. Each body section 12 and 13 has a side wall 38 with a longitudinally extending concave, finger-receiving contour or groove 38. For a right-handed person, the thumb of the user's right hand will be received in the groove 38 in the side plate 12 in the labeler position shown in FIG. 2 for example and the remaining fingers of the user's right hand will be received in the groove 38 of the body section 13. The reverse would apply to a left-handed person, so the labeler 10 can be used with equal facility by both right and left-handed persons regardless of the direction of threading of the carrier web W.

The body sections 12 and 13 have holes 39 and 40. Semi-tubular studs 41 and 42 on the body sections have grooves 43 and 44. The grooves 43 of one pair of studs 41 are aligned with the holes 39 in body sections 12 and 13, and the grooves 44 of the other pair of studs 42 are aligned with holes 40 in the body sections 12 and 13. When the body sections 12 and 13 are brought together into abutting relationship during assembly, identical expandable fasteners 45 are inserted into the respective holes 39 and 40 in, for example, body section 12, through respective pairs of grooves 43 and 44 and into respective holes 39 and 40 in the body section 13. Thereafter an expander pin 46 is passed into each fastener 45 to expand its respective shank 47 and retain the body sections 12 and 13 in assembled relationship.

The holder 14 in the illustrated embodiment is comprised of two identical one-piece molded plastics body sections 48 and 48'. Each body section 48 and 48' has a wall 49. The walls 49 are arranged in spaced side-by-side generally parallel relationship and straddle the roll R. Leaf springs 50 and 51 are connected to each wall 49 by respective connectors 52 and 53. The leaf springs 50 and 51 are curved and extend in the plane of the roll R. The leaf springs 50 and 51 of each body section 48 and 48' are flexible and resilient enough to be spread apart during loading and removal of a roll R from between walls 49. When spread apart, end portions 54 and 55 of each body section 48 and 48' are moved apart to enable the circular outer periphery of the roll R to pass therebetween. Thereafter, the end portions 54 and 55 of each body section 48 and 48' spring toward each other again into the position shown in the drawings. It is apparent that essentially one-half the holder 14 extends on one side of the axis above the horizontal plane and the other one-half extends on the other side of the axis A below the horizontal plane.

Each body section 12 and 13 has a socket 56 for receiving a respective stud 57 of a respective holder body section 48 and 48'. When the body sections 48 and 48' are ready to be assembled as described above, each stud 57 is inserted into its respective socket 56, and thereafter the body sections 12 and 13 are moved into abutment with each other and connected or coupled by means of fasteners 45 and pins 46.

The illustrated embodiment uses very few parts as is readily apparent from the foregoing. The body sections 12, 13, 48, 48', the fasteners 45 and pins 46 are each of one-piece molded plastics material. The rolls are 28, 29, 30 and 32 each are either molded or extruded from elastomeric material. The body sections 12 and 13 are identical, the body sections 48 and 48' are identical and rollers 28, 29, 30 and 32 are identical, thus reducing mold costs to a minimum.

Figure 10:
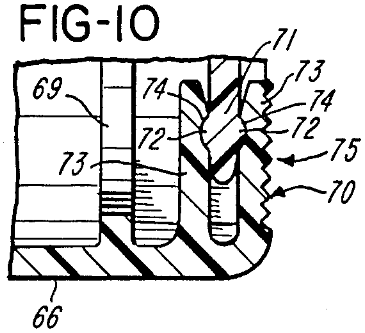
FIG. 10 is a sectional view taken along line 9—9 of FIG. 7.

FIGS. 6 through 10 disclose an alternative embodiment of a label roll holder 60 for use with the labeler 10'. The holder 60 is detachably connectable to the labeler 10' by the user. The labeler 10' is identical to the labeler 10 except that the labeler 10' has a rear portion 60' with a through hole 61. The holder 60 constitutes an enclosure 62 having a pair of spaced walls or wall members 63 which straddle a label roll R. The wall members 63 are identical for economy of manufacture. Each wall member 63 has a hole 64. The holes 64 are axially aligned. Each wall member 63 has a pair of holes 65. A pair of identical closure members 66 are pivotally connected to the wall members 63 by projections 67 received in an opposed pair of the holes 65. Each closure 66 has a generally arcuate portion 68 strengthened by integral ribs 69. Each arcuate portion 68 has a pair of U-shaped members 70. Each wall member 63 has a pair of latch portions 71 with outwardly extending projections 72. Each U-shaped member 70 has a pair of flexible resilient arms 73 and each arm has a recess 74 (FIG. 10). The recesses 74 of each member 70 are opposed and are adapted to receive the projections 72 as best shown in FIG. 10 when the closure member 66 is in the closed position. Each member 70 and respective latch portion 71 constitutes a latch generally indicated at 75. The latch 75 of each closure 66 is released by pulling on the member 76. The member 76 functions both as a guide for the carrier web and as a handle by which the closure member can be opened or closed.

The holder 60 also includes tubular projections 77 having reversed semi-tubular studs 78 having grooves 79. The grooves 79 of one pair of studs 78 are aligned with the holes 80 in tubular projections 77. When the wall members 63 are brought together in assembled relationship, identical expandable fasteners 81 are inserted into holes 80 and grooves 79. The fasteners 81 are the same in construction as the fasteners 45. Pins 81' are used to expand and hold fastener 81. The pins 81' are the same as pins 46.

Figure 8:
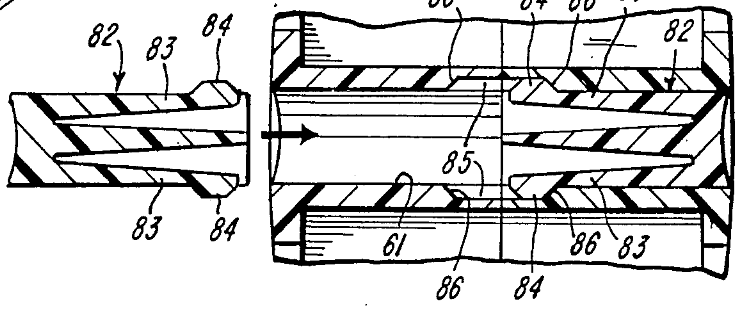
FIG. 8 is a partly exploded view taken generally along line 8—8 of FIG. 7.

Each wall member 63 has a detent 82 with a pair of flexible resilient spring fingers or detent members 83. Each detent members 83 has a pair of teeth 84 received in a recess 85. Each pair of teeth 84 cooperates with a respective shoulder 86. In FIG. 8 one of the detents 82 is shown to be exploded away for clarity. Because identical wall members 63 with integral detents 82 are used, there are actually two detents 82. One detent 82 prevents the holder 60 from becoming detached accidentally by resisting transverse movement of the holder 60 relative to the body 11' in one direction and the other detent 82 prevents the holder 60 from becoming detached accidentally by resisting transverse movement of the holder 60 relative to the body 11' in the opposite direction. In any event, the holder 60 can be removed from the labeler 10' by shifting the holder 60 in either direction so that the detents move out of the hole 61. Conversely, the holder 60 can be attached by sliding the detents 82 into the hole 61.

Figure 7:
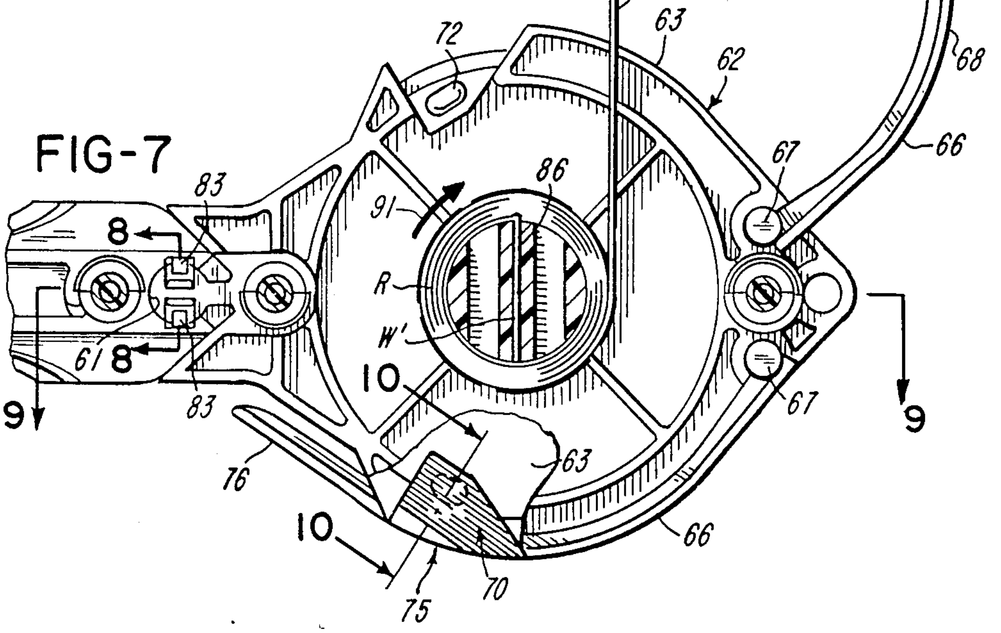
FIG. 7 is a side elevational view of the labeler body and holder shown in FIG. 6 with the one wall member removed for clarity and one of the closure members being shown in the open position.

The labeler 10' with its holder 60 has the feature that not only can a strip of labels be wound into a roll, but the roll can thereafter be used as the supply roll for the labeler 10'. A winder generally indicated at 83' includes a spool or spindle 84 with a pair of knobs 85. Either knob 85 can be rotated manually or either knob 85 can be rotated by power by an electric motor drive (not shown) for example. The spool 84 has a slot 86 and core holes 87 to save plastics material. The spool 84 have a pair of reduced diameter bearing surfaces 88 rotatably received in the holes 64. End portions of the spool 84 have shoulders 89 which contact the inside of the wall members 63 to prevent axial shifting movement of the spool 84. FIG. 7 shows one of the closure members 66 in the open position and a carrier web W with labels L releasably adhered thereto. End portion W' of the carrier web W is inserted in the slot 86 and one of the knobs 85 is turned in the direction of arrow 91 to wind the carrier web W with the labels L into a label supply roll R. The free end of the carrier web can then by threaded through the pathway 33 in the body 10 (or 10') as described above in connection with FIGS. 1 and through 5. It is apparent that both closures 66 are in their closed positions when the labeler 10' is being used. If the winding feature is not needed for a certain application, then the holder 60 is assembled without a winder 83', and in that event a label supply roll can be inserted or removed (assuming one closure member 66 is in the open position) and when both closure members 66 are closed the roll R is confined in the space between wall members 63 and closure members 66.

Figure 9:
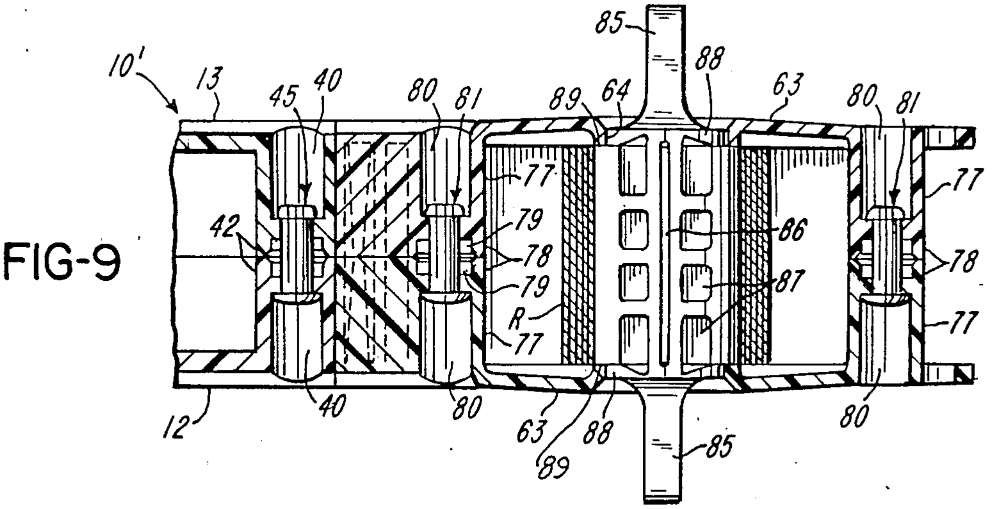
FIG. 9 is a sectional view taken along line 9—9 of FIG. 7.

In assembling the holder 60, the wall members 53 are brought into generally parallel relationship with respect to each other, projections 67 are aligned with respective holes 65, the winder 83' is aligned with holes 64 and the wall members 63 are brought toward each other into the position shown in FIG. 9. Thereupon fasteners 81 are used to connect wall members 63 to each other as shown.

The entire holder 60, namely wall members 63, closure members 66, the winder 83', fastener 81 and pins 81' are composed of molded plastics material.

Other embodiments and modifications of this invention will suggest themselves to those skilled in the art and all such of these as come within the spirit of this invention are included within its scope as best defined by the appended claims.

I claim:

1. A hand-held labeler for applying labels releasably adhered to a carrier web, comprising: a labeler body, means for successively delaminating labels from a carrier web, means adjacent the delaminating means for applying labels, means including a feed roll adapted to contact a surface to be labeled for advancing the carrier web, means defining a feed path for the carrier web to the delaminating means and from the delaminating means to the carrier web advancing means, the labeler body having a pair of adjacent identical one-piece molded plastics body sections, and wherein each one-piece body portion includes a portion of the means defining a feed path.

2. A hand-held labeler as defined in claim 1, wherein the delaminating means includes a delaminator composed of a delaminator portion on each body section, wherein the delaminator portions are aligned.

3. A hand-held labeler as defined in claim 1, including means formed partly by one body section and partly by the other body section for deflecting a label into label applying relationship with the label applying means.

4. A hand-held labeler for applying labels releasably adhered to a carrier web, comprising: a labeler body, the body having means for successively delaminating labels from the carrier web, means adjacent the delaminating means for applying labels, means for advancing the carrier web including two feed rolls, the feed rolls projecting beyond the body, either feed roll being cooperable with a surface to be labeled, means defining a feed path to one of the feed rolls, to the delaminating means and to the other feed roll, wherein the carrier web can be loaded into the feed path in one direction or in a direction opposite to the one direction, and the feed roll which contacts the carrier web in the feed path beyond the delaminating means being adapted to contact the surface to be labeled and to cause advance of the carrier web when the body is moved relative to the surface.

5. A hand-held labeler as defined in claim 4, including leaf springs for mounting the feed rolls and biasing both feed rolls into feeding relationship with the carrier web.

6. A hand-held labeler for applying labels releasably adhered to a carrier web, comprising: a labeler body, the body having means for successively delaminating labels from the carrier web, means adjacent the delaminator for applying printed labels, first, second and third feed rolls, leaf springs for rotatably mounting the first and third feed rolls and biasing the first and third feed rolls into cooperation with the second feed roll, means defining a feed path for the carrier web to between the first and second feed rolls, to and about the delaminator, and to and between the second and third feed rolls.

7. A hand-held labeler for applying labels releasably adhered to a carrier web, comprising: a labeler body, means on the body for successively delaminating labels from the carrier web, means adjacent the delaminating means for applying delaminated labels, means for advancing the carrier web to effect label delamination, wherein the body includes a pair of identical, adjacent, connected, molded plastics body sections, means defining a groove in each body section, and the grooves being opposed and defining a path for the carrier web.

8. A hand-held labeler as defined in claim 7, wherein the carrier web advancing means includes three feed rolls.

9. A hand-held labeler as defined in claim 7, including a pair of deflectors for deflecting the label into underlying relationship relative to the label applying means during label delamination.

10. A hand-held labeler as defined in claim 7, wherein the body sections are elongated, wherein the body has a longitudinal axis, wherein the feeding means includes a feed roll through which the axis passes.

11. A hand-held labeler as defined in claim 7, wherein the body sections are elongated, wherein the body has a longitudinal axis, wherein the advancing means includes first, second and third feed rolls, wherein the second feed roll lies on the axis and cooperates with the first and third feed rolls, wherein the first and third feed rolls lie on opposite sides of the axis.

12. A hand-held labeler for applying labels releasably adhered to a carrier web, the labeler comprising: a body, means on the body for delaminating labels from the carrier web, means adjacent the delaminating means for applying labels, means in feeding cooperation with the carrier web and adapted to be moved during movement of the body along a surface to be labeled for advancing the carrier web to dispense a label into label applying relationship with respect to the label applying means, wherein the carrier web advancing means includes feed rolls disposed at spaced locations and projecting beyond the labeler body, and either feed roll being selectably cooperable with a surface to be labeled for effecting advance of the carrier web.

13. A hand-held labeler as defined in claim 12, wherein the labeler is symmetrical about the axis.

14. A hand-held labeler as defined in claim 12, wherein the labeler is symmetrical about a vertical plane through the axis, and wherein the labeler is symmetrical about a horizontal plane through the axis.

15. A hand-held labeler for applying labels releasably adhered to a carrier web, the labeler comprising: a body, means on the body for delaminating labels from the carrier web, means adjacent the delaminating means for applying labels, means for advancing the carrier web to dispense a label into label applying relationship with respect to the label applying means, and means defining a feed path to accept the carrier web threaded into the labeler in either one direction or in a direction opposite to the one direction into cooperation with the carrier web advancing means and the delaminating means.

16. A hand-held labeler for applying labels releasably adhered to a carrier web, the carrier web and its labels being wound into a supply roll, comprising: a labeler body, means on the labeler body for successively delaminating labels from the carrier web, means adjacent the delaminating means for applying labels, means for holding a label supply roll, the holding means including a holder having a holder body, the holder body having a pair of identical, adjacent holder body sections connected to the labeler body, wherein each holder body section has an integrally molded projection cooperable with the labeler body for releasably connecting the holder and the labeler body.

17. A hand-held labeler as defined in claim 16 wherein the labeler body has body sections, and wherein the holder body sections are held captive between the labeler body sections.

18. A hand-held labeler as defined in claim 16, wherein the holder body includes spring fingers spreadable to enable insertion and removal of a supply roll.

19. A hand-held labeler as defined in claim 18, wherein each holder body section is composed of plastics material with which the spring fingers are integrally molded.

20. A hand-held labeler for applying labels releasably adhered to a carrier web, the carrier web and its labels being wound into a supply roll, the labeler comprising:

a labeler body, means on the body for successively delaminating labels from the carrier web, means adjacent the delaminating means for applying labels, means for holding a label supply roll, the holding means including a holder having a holder body, the holder body including connected holder body sections, wherein the body sections are composed of molded plastics material and each body section has an integrally molded spring finger, the spring finger being spreadable to enable the insertion and removal of a label supply roll, the spring fingers being resiliently returnable to enable a label supply roll to be held in the labeler.

21. Method of making a labeler, the labeler being adapted to apply labels releasably adhered to a carrier web, comprising the steps of: molding two identical one-piece body sections each having a portion of means for mounting feeding means, a portion of means for mounting an applicator, and a portion of a guideway for a carrier web, providing a feed roll, providing an applicator, assembling the feeding means and the applicator onto the body sections, and connecting the body sections to each other.

22. A hand-held labeler for applying labels releasably adhered to a carrier web, comprising: an elongate labeler body having a front end portion, a rear end portion and a connecting elongate portion, means at the front end portion for successively delaminating labels from the carrier web, means on the front end portion adjacent the delaminating means for applying labels, cooperable feed rolls rotatably mounted on the front end portion, at least one of the feed rolls projecting beyond the front end portion and being cooperable with a surface to be labeled, a label roll holder connected to the rear end portion, and means defining a feed path for the carrier web from the label roll holder, along the elongate portion, to the delaminating means and to between the feed rolls.

23. A hand-held labeler as defined in claim 2, including means formed partly by one body section and partly by the other body section for deflecting a label into label applying relationship with the label applying means.

* * * * *